Jan. 10, 1967  J. T. SHAFFER ETAL  3,296,893

POWER TRANSMISSION

Filed July 16, 1964

INVENTORS
WADE A. ESKRIDGE
JACK T. SHAFFER

BY

ATTORNEYS

United States Patent Office 3,296,893
Patented Jan. 10, 1967

3,296,893
POWER TRANSMISSION
Jack T. Shaffer, Tulsa, Okla., and Wade A. Eskridge, Minneapolis, Minn., assignors to Sperry Rand Corporation, Troy, Mich., a corporation of Delaware
Filed July 16, 1964, Ser. No. 383,090
7 Claims. (Cl. 74—750)

This invention relates to power transmissions and more particularly those of the type used in driving winches and the like, wherein it may be desired to vary the drive ratio and to provide a brake for automatically restraining a load at times when power is not applied, or in case of power failure.

In the past, it has been customary practice in winch power transmissions to utilize a worm gear drive to obtain the desired speed reduction, taking advantage of the irreversibility of the worm gear to provide a brake. The disadvantages of this approach lie in the low efficiency of worm gearing and the difficulty of integrating speed change mechanism with the worm gear system.

High-efficiency gearing has been used in winch drives in some instances but the necessity for providing a separate braking system has caused added complexity and cost.

An additional problem with most prior transmissions has been that it has been necessary to stop the winch drive to effect change in drive ratio.

A further disadvantage of prior art devices using friction brakes has been that when the winch is driven in the payout direction, the brake is heavily loaded, resulting in short life of the brake. This is true even in the case of drives having brake force proportional to load.

It is an object of this invention to provide an improved winch drive.

More specifically, it is an object of this invention to provide a compact, low-cost winch drive having high efficiency, automatic braking, and speed change capability.

Another object of this invention is to provide a hydraulically powered winch drive in which the hydraulic pressure source for the winch drive also is utilized for controlling the brake.

An additional object is to provide a winch drive in which the brake will have long life by reason of being applied only when needed and only to the extent necessary for proper control.

A further object is to provide such a winch drive in which frictional braking is supplanted by hydraulic braking during certain phases of operation and the changeover is automatically effected.

Further objects and advantages of the present invention will be apparent from the following descriptions, reference being had to the accompanying drawing where a preferred form of the present invention is clearly shown.

Figure 1:
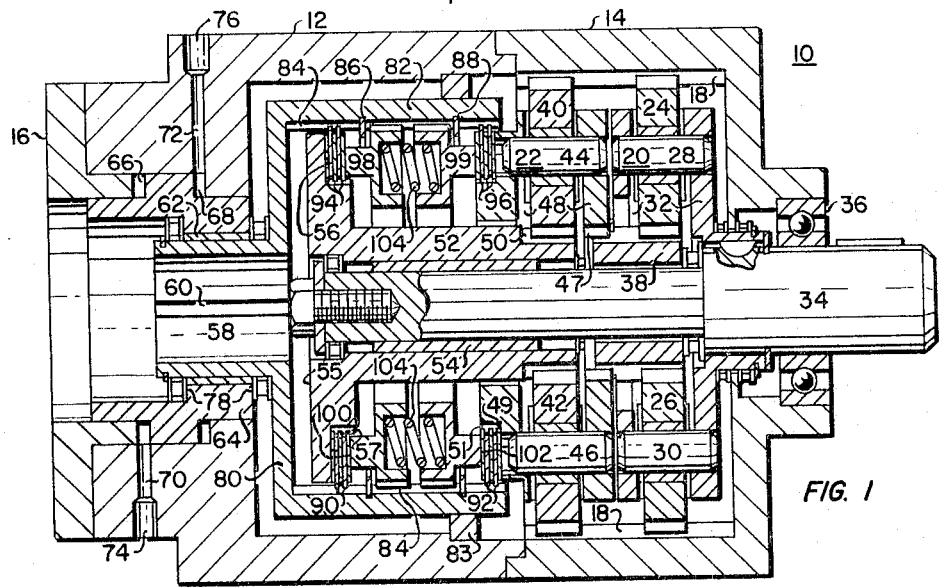
FIGURE 1 is a cross-sectional view of a winch drive transmission incorporating the present invention.

Referring now to FIGURE 1, the transmission generally designated 10 includes a central housing member 12 having affixed thereto an end bell 14 and an end cap 16. End bell 14 is internally toothed to provide a fixed, common ring gear 18 for two planetary gear sets generally designated 20 and 22. For purposes of drawing clarity, only two teeth of ring gear 18 are shown.

Figure 2:
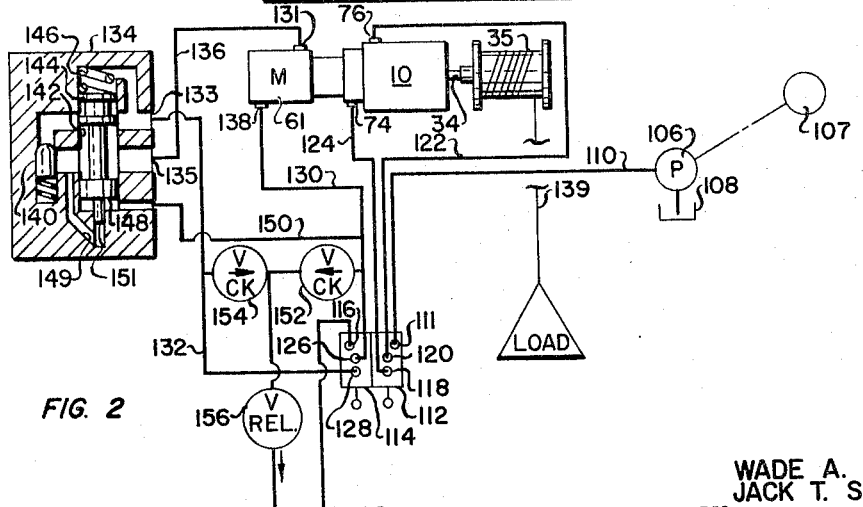
FIGURE 2 is a schematic drawing of the winch drive transmission of FIGURE 1 coupled to its hydraulic driving motor and illustrating the hydraulic system which also is part of this invention.

Planetary gear set 20 includes planet gears 24 and 26 which are rotatably supported on axles 28 and 30, respectively, and engage ring gear 18. Axles 28 and 30 are fixedly mounted in a planet carrier 32 which is keyed to an output shaft 34, supported at its outer end in a bearing 36. Shaft 34 drives the winch drum 35, as shown in FIGURE 2. The sun gear 38 of planetary set 20 is free to rotate about the output shaft 34.

Planetary gear set 22 includes planet gears 40 and 42 which are rotatably supported on axles 44 and 46, respectively, and engage ring gear 18. Axles 44 and 46 are fixedly mounted in a planet carrier 48 which is internally toothed at 47 to engage and drive sun gear 38 of planetary gear set 20. Carrier 48 has a flat, radial friction face 49 which is employed in the driving, shifting and braking functions, as will later be explained. Carrier 48 is externally toothed at 51.

Sun gear 50 of planetary set 22 is carried on an elongated, hollow shaft 52 whicch is journalled in a plain bearing 54 on output shaft 34. Shaft 52 includes a radially extending flange 55 which has a flat, radial friction face 56 which is employed in the driving, shifting and braking functions as will later be explained. Flange 55 is externally toothed at 57.

Input shaft 58 of transmission 10 has a keway 60 through which the transmission is coupled to a conventional, reversible hydraulic motor 61 mounted against the end of transmission 10 as shown in FIGURE 2. Input shaft 58 is supported in a plain bearing 62 carried by an axially slidable piston 64. Piston 64 forms with housing 12 and end cap 16, a pair of pressure chambers 66 and 68 which are connected by passages 70 and 72 to a pair of external connection ports 74 and 76, respectively. Thrust bearings 78 couple input shaft 58 to piston 64 so that input shaft 58 moves axially along with piston 64 but is free to rotate relative thereto.

Input shaft 58 includes a radially extending flange 80 having a cylindrical section 82 extending axially therefrom and supported for both rotation and axial sliding in housing 12 by a plain bearing 83. Cylindrical section 82 is internally, circumferentially toothed at 84 and is grooved to receive a pair of internal snap rings 86 and 88. For purposes of drawing clarity, only two of the teeth 84 are shown. A set of friction discs 90 and a set of friction discs 92 are externally toothed so as to engage the teeth 84 and be driven in rotation thereby but are capable of axial movement therein.

A set of friction discs 94 are internally toothed to engage the external teeth 57 on flange 55 so as to be driven in rotation thereby but capable of axial movement thereon. Discs 94 alternate with discs 90 in their axial spacing and perform clutching and braking functions as hereinafter described. Similarly, a set of friction discs 96 are internally toothed to engage the external teeth 51 on the planet carrier 48 of planetary gear set 22 so as to be driven in rotation thereby but capable of axial movement thereon. Discs 96 alternate with discs 92 in their axial spacing and perform clutching and braking functions as hereinafter described.

A pair of annular brake loading members 98 and 99 are externally toothed to engage the teeth 84 of input shaft 58 so as to be driven in rotation thereby but capable of a degree of axial movement relative thereto, as limited by the snap rings 86 and 88, respectively.

Loading member 98 includes a radial, flat friction face 100 which is opposed to face 56 carried by the shaft 52. Friction discs 90 and 94 are sandwiched between faces 56 and 100. Similarly, loading member 99 includes a radial, flat friction face 102 which is opposed to face 49 on the planet carrier 48 of planetary gear set 22. Friction discs 92 and 96 are sandwiched between faces 49 and 102.

Resilient biasing means in the form of springs 104 are interposed between loading members 98 and 99 so as to impose equal and opposite forces thereon. When input shaft 58 is in the axial position shown in FIGURE 1, it is frictionally locked to shaft 52 which carries sun gear 50 of planetary gear set 22 and is also frictionally locked to planet carrier 48 of planetary gear set 22. Thus, two elements of planetary gear set 22; namely, the sun gear and planet carrier are locked together and, since the third element, ring gear 18, is stationary in end bell 14, the planetary gear set 22 is completely locked. Locking of gear set 22 results in locking sun gear 38 of gear set 20 and, since its ring gear 18 is stationary in end bell 14, gear set 20 is completely locked. Output shaft 34 being coupled to the planet carrier 32 of gear set 20, as previously described, the winch drum 35 will be locked against rotation.

To effect low-speed drive of output shaft 34, fluid pressure is applied to chamber 68 via port 76 and passage 72, shifting piston 64 to the left. Piston 64 carries input shaft 58 with it. Snap ring 88 contacts loading member 99, pushing it leftwardly so as to unload friction discs 92 and 96 and, by reason of added compression of springs 104, increases the loading on friction discs 90 and 94. Power flow through the transmission 10 will then be from input shaft 58 to shaft 52, driving the sun gear 50 of gear set 22. Planet carrier 48 of gear set 22 is now free to rotate and will drive the sun gear 38 of gear set 20 which, through planet carrier 32, will drive output shaft 34 at low speed. It might be noted here that gear set 20 operates as a constant, second stage of speed reduction.

To effect high-speed drive of output shaft 34, fluid pressure is applied to chamber 66 via port 74 and passage 70, shifting piston 64 to the right. Piston 64 carries input shaft 58 with it. Snap ring 86 contacts loading member 98, pushing it rightwardly so as to unload friction discs 90 and 94 and, by reason of added compression of springs 104, increases the loading on friction discs 92 and 96. Power flow through the transmission 10 will be from input shaft 58 to the planet carrier 48 of gear set 22, then to sun gear 38 of gear set 20 and through planet carrier 32 to drive output shaft 34 at high speed.

Springs 104 and the pressure effective areas of piston 64 are so related that a pressure of approximately 150 p.s.i. in chamber 66 or 68 will effect speed selection.

Referring now to FIGURE 2, a conventional, reversible hydraulic motor 61 is shown mounted on the transmission 10, its output shaft being coupled to the input shaft 58. Output shaft 34 of the transmission 10 is coupled to a winch drum 35. A pump 106 driven by a prime mover 107 is supplied with fluid from a tank 108 and delivers it through pressure line 110 to the inlet port 111 of a pair of directional control valves 112 and 114.

Figure 3:
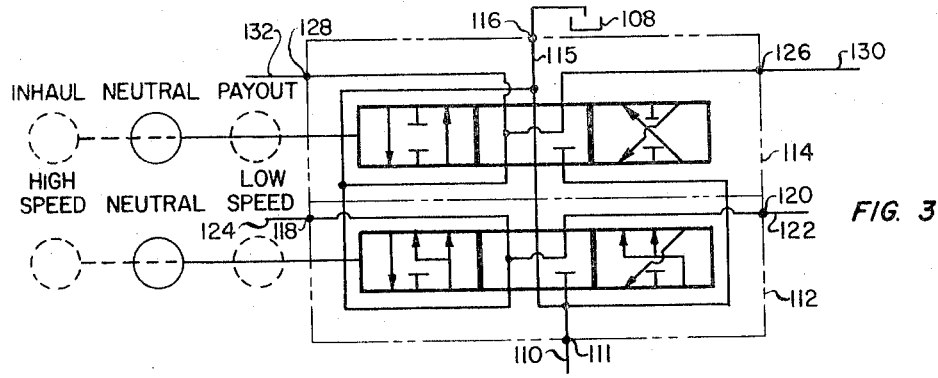
FIGURE 3 is a schematic drawing of certain control valves in the system.

Valves 112 and 114 are of the sectional type which are bolted together so as to effect communication of various internal passages. The directional spools and internal passages are illustrated schematically in FIGURE 3. Each of the spools is of the three-position type and is shown in the neutral position. An internal by-pass passage 115 connects inlet port 111 to a drain port 116 so long as the spool of valve 114 is in the neutral position, regardless of the position of the spool of valve 112. Thus, no pressure can be generated by the pump until the spool of valve 114 is shifted.

Valve 112 has a pair of motor ports 118 and 120. Port 120 is connected by a conduit 122 to the connection port 76 of transmission 10. Port 118 is connected by a conduit 124 to the connection port 74 of transmission 10. Port 118 is connected by a conduit 124 to the connection port 74 of transmission 10.

Valve 114 has a pair of motor ports 126 and 128. Port 126 is connected by a conduit 130 to one port 138 of motor 61. Port 128 is connected by a conduit 132 to port 133 of a valve 134 which has a port 135 connected by a conduit 136 to the other port 131 of motor 61. Motor 61 will rotate in one direction or the other, dependent on whether pressure is delivered to port 131 or port 138. The cable is wound on the drum 35 so that when motor port 131 is under pressure, the drum's rotation will be in the inhaul direction and when motor port 138 is under pressure, the drum's rotation will be in the payout direction.

Valve 134 provides two paths for fluid flow between ports 133 and 135. The first path includes a check valve 140 which permits flow from port 133 to port 135 but blocks reverse flow. The second path is through a bore 142 which contains a valve spool 144 biased by a spring 146 to a position in which it blocks flow through bore 142. Spool 144 may be shifted against spring 146, so as to open the second path, by fluid pressure applied to area 148. Area 148 and spring 146 are so related that a pressure of approximately 300 p.s.i. will open the second passage. A pressure sensing conduit 150 leads from conduit 130 to area 148 so as to impose the pressure in conduit 130 on the area 148. As was previously noted, approximately 150 p.s.i. is all that is required to effect speed selection in transmission 10.

Valve 134 includes an internal sensing passage 149 which leads from the port 135 to the lower end of a small piston 151, the upper end of which contacts spool 144. The end area of piston 151 and the load of spring 146 are so related that spool 144 will be shifted to connect ports 135 and 133 should the pressure in port 135 and hence, on piston 151, approach that which would be destructive of motor 61.

In addition to the overpressure protection afforded by valve 134, the conduits 130 and 132 are connected across check valves 152 and 154, respectively, to a relief valve 156 which protects the pump and other components of the system.

In operation, prime mover 107 drives pump 106 which draws fluid from tank 108 and delivers it to conduit 110 and the inlet port 111 in valve 112. When control valves 112 and 114 are in the neutral position, illustrated in FIGURE 3, the inlet port 111 is directly connected to the outlet port 116 and the pump delivery is by-passed back to tank 108.

Assuming it is desired to operate the winch in the inhaul direction at low speed, valve 112 will be shifted to the low-speed position thus, connecting port 111 to port 120, conduit 122; thence to chamber 68. No pressure will be generated at this time since port 111 will still be connected to tank port 116 to by-pass the pump delivery. This arrangement prevents inadvertent release of the brakes before motor 61 is in operation. In the low-speed position of valve 112, port 118, conduit 124 and chamber 66 will be connected to tank port 116. Upon shifting of valve 114 to the inhaul position, by-pass 115 will be blocked and pump 106 will now generate pressure, releasing the brake and shifting transmission 10 into the low-speed range as previously described. At the same time, pressure fluid will be directed to port 128 of valve 114 and thence, to conduit 132, port 133 of valve 134, over check valve 140, out port 135 to conduit 136 to drive motor 61 in the inhaul direction. In the inhaul position of valve 114, port 126 and conduit 130 will be connected to tank port 116, thus, providing a free return of fluid from motor 61. When the spools of both valves 112 and 114 are shifted from the neutral position, the devices controlled thereby are in parallel circuit relation and will be at equal operating pressures. It should be noted that so long as the pressure required for inhaul exceeds 150 p.s.i., the friction discs 92 and 96 will be completely unloaded and thus free from wear. Even when hauling in a slack cable, discs 92 and 96 can only generate a maximum frictional drag of a magnitude requiring something less than 150 p.s.i. in the fluid pressure system since, at this point, they would be released. If it should be desired to shift to high-speed inhaul, valve 112 may be moved, abruptly if desired, to the position in which it ports fluid to conduit 124 and chamber 66. The load will not be released during shifting since the sequence in the transmission will be from low speed to brake to high speed with no loss of control. When the spool of valve 112 is in the neutral position, both chambers 66 and 68 will be vented to tank and the components of transmission 10 will be in the position illustrated in FIGURE 1, thus locking the drive shaft 34 and drum 35 against rotation.

If it is desired to operate the winch in the payout direction, valve 114 is shifted to the payout position in which it ports pressure fluid to port 126, conduit 130 and port 138 of motor 61. Return fluid from motor 61 passes from port 131 through conduit 136 to port 135 of valve 134. This return fluid cannot pass through check valve 140 and it is blocked by valve 144 which in its spring biased position prevents flow through bore 142. Therefore, motor 61 cannot rotate until pressure in line 130 imposed on area 148 through conduit 150 reaches the 300 p.s.i. necessary to shift spool 144 against spring 146. As was previously noted, a pressure of only 150 p.s.i. will fully release the nondriving set of friction discs 90 and 94 or 92 and 96, depending on speed selection. Thus, there will be no wear on the discs when driving in the payout direction.

Should drum 35 tend to overrun, as in lowering a heavy load, the pressure in line 130 will tend to drop below 300 p.s.i. However, when this occurs, valve 144 will close to a throttling position and thus act as a brake, eliminating wear on the friction discs under these conditions.

In the event of pressure loss in the system for any reason, such as stoppage of the prime mover, pump failure or conduit breakage, the springs 104 will immediately and automatically apply both brakes to lock the output shaft 34 and drum 35.

It will be seen that this invention provides a high-efficiency winch transmission having automatic braking, speed change capability, and long life.

While the form of embodiment of the invention as herein disclosed constitutes a preferred form, it is to be understood that other forms might be adopted, all coming within the scope of the claims which follow.

What is claimed is as follows:

1. In a transmission for a winch or the like, the combination of:
   an axially shiftable, rotary input member;
   a rotary output member;
   a planetary gear set having ring, sun and planet elements, one of said elements being fixed;
   a first frictional clutch having one element nonrotatably coupled to said input member and one element nonrotatably coupled to a first non-fixed element of said planetary gear set;
   a second frictional clutch having one element nonrotatably coupled to said input member and one element nonrotatably coupled to a second, non-fixed element of said planetary gear set;
   means coupling one of the non-fixed elements of said planetary gear set to said output member;
   resilient biasing means disposed to apply loading forces simultaneoeusly to said first and second frictional clutches thereby locking together said first and second elements of said planetary gear set;
   and measn for selectively relieving said loading force from said first and second frictional clutches, said means including said input member and being effective upon axial shifting thereof.

2. The combination defined in claim 1 in which the resilient biasing means comprises a compression spring interposed between said clutches to act in common thereon.

3. In a transmission for a winch or the like, the combination of:
   a rotary input member;
   a rotary fluid pressure motor coupled to said input member;
   a rotary output member;
   a planetary gear set having ring, sun and planet elements, one of said elements being fixed;
   a first frictional clutch having one element nonrotatably coupled to said input member and one element nonrotatably coupled to a first, non-fixed element of said planetary gear set;
   a second frictional brake having one element nonrotatably coupled to said input member and one element nonrotatably coupled to a second, non-fixed element of said planetary gear set;
   means coupling one of the non-fixed elements of said planetary gear set to said output member;
   resilient biasing means disposed to apply loading forces simultaneously to said first and second frictional clutches thereby locking together said first and second elements of said planetary gear set;
   fluid pressure actuated means for selectively relieving said loading force from said first and second frictional clutches;
   a source of fluid pressure;
   and control valve means for connecting said source in parallel circuit relation with said motor and said fluid pressure actuated means.

4. The combination defined in claim 3 in which the control valve means unloads the source until communication is established between the source and said motor.

5. In a transmission for a winch or the like, the combination of:
   a rotary input member;
   a rotary fluid pressure motor coupled to said input member and having a pair of ports;
   a rotary output member;
   a planetary gear set having ring, sun and planet elements, one of said elements being fixed;
   a first frictional clutch having one element nonrotatably coupled to said input member and one element nonrotatably coupled to a first, non-fixed element of said planetary gear set;
   a second frictional clutch having one element nonrotatably coupled to said input member and one element nonrotatably coupled to a second, non-fixed element of said planetary gear set;
   means coupling one of the non-fixed elements of said planetary gear set to said output member;
   resilient biasing means disposed to apply loading forces simultaneously to said first and second frictional clutches thereby locking together said first and second elements of said planetary gear set;
   fluid pressure actuated means for selectively relieving said loading force from said first and second frictional clutches;
   a source of fluid pressure;
   control valve means for connecting said source in parallel circuit relation with one port of said motor and said fluid pressure actuated means;
   normally closed valve means in communication with the other port of said motor;
   fluid pressure responsive means for opening said normally closed valve means;
   and means for imposing the pressure of said source on said fluid pressure responsive means.

6. The combination defined in claim 5 in which a lower pressure is required to relieve said loading force than to open said normally closed valve means.

7. In a transmission for a winch or the like, the combination of:
   a rotary input member;
   a rotary fluid pressure motor coupled to said input member and having a pair of ports;
   a rotary output member;
   a planetary gear set having ring, sun and planet elements, one of said elements being fixed;
   a first frictional clutch having one element nonrotatably coupled to said input member and one element nonrotatably coupled to a first, non-fixed element of said planetary gear set;

a second frictional brake having one element nonrotatably coupled to said input member and one element nonrotatably coupled to a second, non-fixed element of said planetary gear set;

means coupling one of the non-fixed elements of said planetary gear set to said output member;

resilient biasing means disposed to apply loading forces simultaneously to said first and second frictional clutches thereby locking together said first and second elements of said planetary gear set;

fluid pressure actuated means for selectively relieving said loading force from said first and second frictional clutches;

a source of fluid pressure;

control valve means for connecting said source in parallel circuit relation with one port of said motor and said fluid pressure actuated means;

normally closed valve means in communication with the other port of said motor;

first and second fluid pressure responsive means for opening said normally closed valve means;

means for imposing the pressure of said source on said first fluid pressure responsive means;

and means for imposing the pressure at said other port on said second fluid pressure responsive means.

References Cited by the Examiner
UNITED STATES PATENTS

| | | | |
|---|---|---|---|
| 2,693,722 | 11/1954 | Winther | 74—750 |
| 2,927,669 | 3/1960 | Walerowski | 192—3 |
| 3,212,611 | 10/1965 | Ruoff et al. | 192—48 |

DAVID J. WILLIAMOWSKY, *Primary Examiner.*

J. R. BENEFIEL, *Assistant Examiner.*